(12) United States Patent
Smith

(10) Patent No.: US 6,570,147 B2
(45) Date of Patent: May 27, 2003

(54) COLOR NIGHT VISION APPARATUS

(75) Inventor: Arlynn Walter Smith, Blue Ridge, VA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 81 days.

(21) Appl. No.: 09/862,852

(22) Filed: May 22, 2001

(65) Prior Publication Data

US 2002/0175268 A1 Nov. 28, 2002

(51) Int. Cl.[7] .................................. H01J 40/14
(52) U.S. Cl. ........................ 250/214 VT; 250/208.1; 313/103 R; 313/103 CM; 313/105 CM
(58) Field of Search ................... 250/213, 385, 250/208.1, 214 R, 216, 226, 207, 214 VT; 315/12; 313/103, 101, 103 R, 103 CM, 105 CM; 359/480

(56) References Cited

U.S. PATENT DOCUMENTS

| | | | |
|---|---|---|---|
| 3,863,093 A | 1/1975 | Orthuber | 315/12 |
| 3,912,386 A | 10/1975 | Gorog et al. | 353/122 |
| 3,987,299 A | 10/1976 | Mulder | 250/213 |
| 4,009,941 A | 3/1977 | Verdijk et al. | 350/173 |
| 4,268,119 A | 5/1981 | Hartmann | 350/173 |
| 4,374,325 A | 2/1983 | Howorth | 250/213 |
| 4,724,354 A | 2/1988 | Dill | 313/371 |
| 4,764,806 A | 8/1988 | Altman | 358/60 |
| 4,789,891 A | 12/1988 | Kanayama et al. | 358/55 |
| 4,933,751 A | 6/1990 | Shinonaga et al. | 358/55 |
| 5,042,912 A | 8/1991 | Sato et al. | 359/638 |
| 5,103,301 A | 4/1992 | Cosentino | 358/42 |
| 5,162,647 A | 11/1992 | Field, Jr. | 250/214 |
| 5,168,351 A | 12/1992 | Bradley et al. | 358/60 |
| 5,214,503 A | * 5/1993 | Chiu et al. | 348/217.1 |
| 5,233,183 A | 8/1993 | Field | 250/214 |
| 5,241,170 A | 8/1993 | Field, Jr. et al. | 250/214 |
| 5,266,425 A | 11/1993 | Field, Jr. | 430/7 |
| 5,398,081 A | 3/1995 | Jones | 348/742 |
| 5,555,324 A | 9/1996 | Waxman et al. | 382/254 |
| 5,602,394 A | 2/1997 | Dombrowski et al. | 250/339.02 |
| 5,742,115 A | 4/1998 | Gertsenshteyn | 313/365 |

* cited by examiner

Primary Examiner—David Porta
Assistant Examiner—Patrick J. Lee
(74) Attorney, Agent, or Firm—Duane Morris LLP

(57) ABSTRACT

There is disclosed a color night vision device, which employs a separate image intensifier for each primary color. Thus, the apparatus employs an image intensifier for red, an image intensifier for green and an image intensifier for blue. In one embodiment, each image intensifier produces an image of that color from light which is distributed to the input of the image intensifier through a dichroic X-Cube system. The output of each image intensifier produces an image corresponding to the input image of a corresponding color. Thus, the green image intensifier produces a green image, the red image intensifier produces a red image and the blue image intensifier produces a blue image. The three images are superimposed or combined to produce a true color output image. Superimposition of the images can occur by means of a suitable dichroic output device which is similar to the dichroic input device or in alternate embodiments, the use of bent fibers or charge coupled display devices.

13 Claims, 2 Drawing Sheets

COLOR NIGHT VISION APPARATUS

FIELD OF THE INVENTION

The present invention relates to a color night vision apparatus, and more particularly, to a color night vision apparatus employing multiple image intensifiers for viewing images in color during nighttime conditions or scenes under low light conditions.

DESCRIPTION OF THE PRIOR ART AND BACKGROUND

Typically night vision goggles are monochrome output devices. In this manner, they take white light and input and amplify all colors and produce an monochrome display which is usually green due to the phosphors used. Several approaches to produce a color night vision system have been attempted. One technique uses two synchronized spinning color filter wheels in front and back of the image intensifier tube assembly. For example of this technique, reference is made to U.S. Pat. No. 5,162,647 issued on Nov. 10, 1992 to R. J. Field, Jr. and entitled, "Color Image Intensifier Device Utilizing Color Input and Output Filters Being Offset By a Slight Phase Lag" and is assigned to ITT Corporation, the assignee herein.

Essentially, the patent shows a color image intensifier device which uses an intensifier tube normally providing a monochrome output. There are input and output color members for passing respective different light frequencies. The input color member filters the incoming light to the tube of each light spectrum band in time succession and the monochrome output of the tube passes through an output color filter to produce a corresponding color component.

Another approach is to utilize spatial color filters in both the input and output of the image intensifier. These can be colored fiber optic cables or colored micro-lenses. This approach is a similar approach as analogous to operation in current cathode ray tube technology. The primary colors, for example, red (R), green (G) and blue (B) are sensed and displayed in different spatial positions adjacent to each other on a pixel level or scale. This produces a true color image. The above approaches all produce a direct view system.

Another approach is an indirect view system. In an indirect view system, input color filters such as a filter wheel, a sequential filter or micro-lenses are employed. The output of the image intensifier is then coupled directly to a CCD, or other imaging electronics. In the case of the spinning filter wheel, or the electronically tunable filter, the CCD is scanned at a rate appropriate to the filter. This produces three separate color images that are fused or combined together into a color image. In the case of the color fiber optical micro-lens, each pixel on the CCD corresponds to a different color. Adjacent pixels would then be fused into one color image. Depending on a filtering mechanism, these approaches can lead to true color images or false color images, if the near IR photons are filtered out.

As one can understand, it is desirable to have a color display for many reasons. For example, image pattern recognition is easier with a color image rather than a monochrome image. A color image is more desirable in surveillance applications, as it is desirable to use a color image intensifier device for consumer applications. Television news programs have shown scenes of and from image intensifiers to show news events and images during nighttime television operations. These images appear in a green color or in monochrome. These images are very different from the images one typically perceives viewing color television. A color image intensifier device prevents image loss during critical conditions by providing an output image in true color such as for nighttime medical care or for use in surgery.

For another example of a color image night vision device, reference is made to U.S. Pat. No. 5,233,183 to R. J. Field entitled, "Color Image Intensifier Device and Method for Producing the Same" and issued on Aug. 3, 1993 and is assigned to the assignee herein. In that patent, there is shown an image intensifier for producing a color output image, which has an RGB color filter matrix screen printed on a glass wafer which is laminated to the input faceplate of the tube and is sandwiched between the faceplate and the photocathode. The RGB matrix filters incident light into RGB components, which are amplified by the tube. The output image is colorized in a first embodiment by passing white light fluorescing from a phosphor layer through an RGB output filter matrix, which is aligned in an operating tube with the input matrix. In the second embodiment, a UV emanating phosphor layer excites an RGB matrix of secondary phosphors.

In any event, as is known, there are many different ways of producing color night vision displays in the prior art. A major disadvantage of prior art devices is that in order to produce the color image, the above mentioned approach separates the color signals in the white light in two distinct manners. Each of these approaches lead to some form of degradation of the system compared to optimum performance. The filters are time separation devices. Therefore, during the cycle when the red filter is in place, both the green and blue signals are attenuated. This leads to a reduction in the incoming signal by 66% if all time slices are equal for the colors. The 66% is derived from the fact that there are three primary colors involved. In addition, for electronically tunable filters, more light is lost in the transmission through the filters. Typically, these filters have a white light transmission value between 8 and 30%. This reduces the input signal to a range of 10 to 20%. Another disadvantage of electronically tunable filters is that these typically filter out the near IR portion of the spectrum which the image intensifier is fairly sensitive to. The reduction in the input signal results in poor level performance of the color night vision system. The micro-lens or color fiber optic approach separates the white light into colors spatially. The red, blue and green light are focused in immediately adjacent areas on the photocathode. This technique results in loss of signal, again in the range of 66% for the fiber optic and perhaps lower for the micro-lens. In any event, it does result in reduction of the overall resolution of the system.

In a color system, each monochrome pixel has to include three pixels, one for each primary color. This results in a loss in system resolution on the order of 30 to 40%. This is a loss in resolution if the pixels are of the same size as the monochrome pixel. In addition, each of the direct view approaches require the use of white phosphors. Typically, these white phosphors are less efficient than monochrome phosphors. The operation of the phosphor must be at a very high level to maintain the output brightness because the output signal is required to pass through the imaging filter assembly, and therefore reduces the output signal.

None of the above-mentioned approaches allow for the optimization of the image intensifier to specific portions of the spectrum which are supposed to be sensed.

A desirable approach would be to maintain the low light level sensitivity and the resolution according to the most modern efficient monochrome display. The problem of using a non-direct view system is the computer processing required to display the colorized image. In addition, current display devices which are small enough for head-mounted systems cannot and do not have the resolution comparable to the image intensifier system.

It is therefore an object of the present invention to provide a higher sensitivity and greater resolution color night vision system by retaining as much of the input signal light as possible while separating the colors spatially.

The resolution of the system is maintained because each color is imaged to a different spatial position to be amplified. The three color amplified image are recombined in a process which is the reverse of the input separation. The recombination forms a full color image. A true color image is provided with the addition of near IR blocking filter, otherwise a false color image would be provide which is red loaded. Due to the frequency or wavelength of infrared, this image would contain an excessive amount of red. By using three image intensifier tubes, each tube can be optimized for specific wavelengths of the spectrum allowing an improved lower light level performance.

SUMMARY OF THE INVENTION

A color night vision apparatus comprises at least three image intensifier tubes, each one associated with a different one primary color, and each tube having an input for receiving a low light image and an output for providing an intensified image. An input dichroic frequency splitter is positioned between the input of each tube and has an input port for receiving said low light image, and directs said input signal to said input of each tube, to cause each tube to provide an intensified output of said input signal and according to a primary color content in said input signal as associated with said respective tube, and having means responsive to said output signals of each tube for combining said signals indicative of each primary color to provide an output color image indicative of said low light image.

DETAILED DESCRIPTION OF THE DRAWINGS

Figure 1:
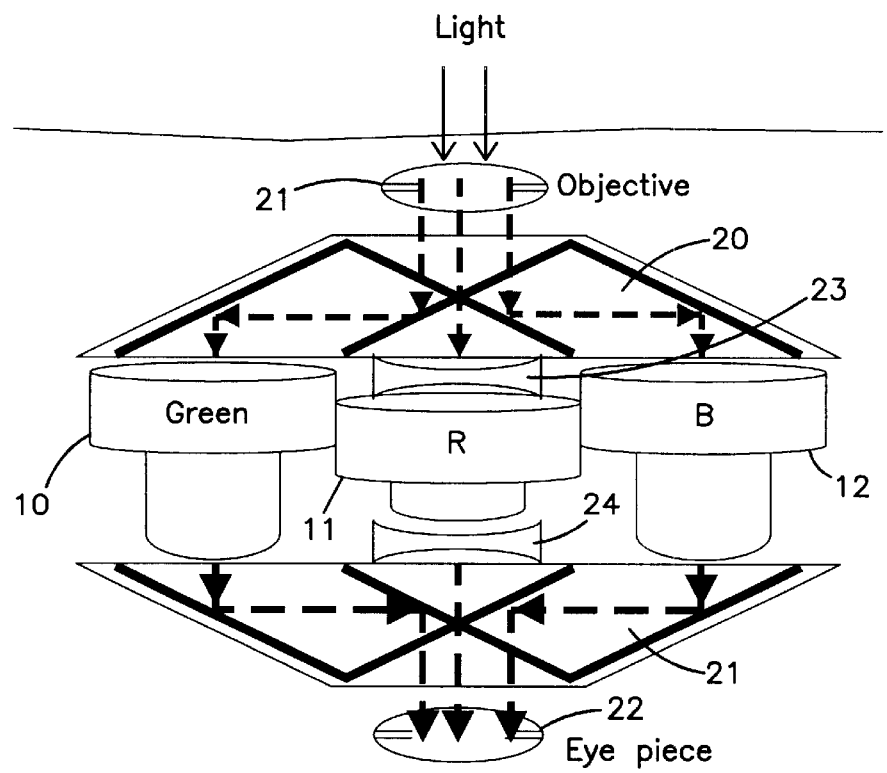
FIG. 1 is a simple block diagram depicting a color night vision system utilizing three image intensifier tubes arranged in a linear pattern with a dichroic X-Cube to split the incoming white light into three colors.

Referring to FIG. 1, there is shown a first embodiment of the present invention. As seen in FIG. 1, there are shown three image intensifier tubes designated as 10, 11 and 12. Image intensifier tube 10 is designated as the green tube (G). Image intensifier tube 11 is designated as the red tube or "R", while the image intensifier tube 12 is designated as the blue tube or "B". The RGB stands for the primary colors red, green and blue, which are widely known in color television and from which three colors all colors can be generated. As one can ascertain, image intensifier tubes are well known.

The primary purpose of an image intensifier tube is to intensify the image without regard to the spectral conversion. As compared, for example, to an image tube which converts an image in one spectral region directly into an image in another spectral region, usually with an increase in intensity. If the primary purpose is to convert the spectral region of the image, the tube is called an image converter tube. If the purpose is to intensify the image, then it is an image intensifier tube. Typical modern image intensifier tubes utilize microchannel plates, which act as an electron multiplier. These tubes are typically used in devices such as night vision goggles, hand-viewing devices, and rifle scopes. It is well known that the assignee herein, namely, ITT, has manufactured and provides many image intensifier tubes of different characteristics for both commercial and military purposes. Hence the tubes designated as 10, 11 and 12 are typical conventional image intensifier tubes.

The image intensifier tubes shown in FIG. 1 are arranged in a linear pattern, with a dichroic X-Cube 20 operative to split incoming light into the three colors. As one can see, light from a given source enters the objective lens 21, where it is then directed to the dichroic cube 20. The dichroic cube 20 splits the light into three color beams, namely, red, green and blue. Thus, each of the image intensifiers 10, 11 and 12 receives light through the objective end, through the objective lens and then through the dichroic X-Cube to the input of the respective image intensifier. Dichroic cubes are sometimes referred to as color beam combining or splitting prisms. As is known, a conventional prism can split light into its color components a red, orange, yellow, green, blue, indigo and violet are the colors of the rainbow. Color beam splitting or combing prisms operate at specific frequencies and are selective to specific wavelengths, such as red, green and blue. Such cubes or splitters are available from many sources. See the website www.cahcorp.com or a company by the name of China Daheng, Corp. who provides such dichroic devices under the trademark ColorBiner Prisms.

As one can ascertain, dichroic prisms as well as semi-reflecting mirrors are reflectors and are used to split a beam of light into one or more parts. A dichroic reflector splits the light beam spectrally in that it transmits certain wavelengths and reflects others. A semi-reflecting mirror is normally at least spectrally neutral. Its function is to divide a beam into two portions, each with similar spectral characteristics. Such devices for splitting light into spectral components are well known, as indicated. It is understood that FIG. 1 is a relatively simple diagram of the color night vision device using three separate image intensifiers.

In the optimal configuration, the input and output dichroic assemblies, which are designated as 20 and 21 can be monolithic pieces. As indicated, the incoming white light is directed through the objective lens 21 and split into three components using the first dichroic mirror X-Cube designated by reference numeral 20. This spectral splitting is accomplished with a minimum of loss in signal amplitude. The dichroic mirrors reflect more than 80% of the selected wavelength, and transmit more than 90% of the unwanted wavelength. This results in a maximum color signal reaching each of the three image intensifier tubes. For the central tube, which is the red tube 11, an optical element 23, both on the input and output is required to make the optical path length equal for each color. This is because the red cube is shown as the center tube. In regard to the image intensifier 11 designated as red, it is shown having a lens 23 at the input, which is a bi-concave configuration or a divergent lens, which would of course change the optical light path at the input of the red image intensifier face plate. There is also shown a bi-concave output lens 24 which directs the output light from the red image intensifier via the cube 21 to the ocular or eyepiece 22. It is also shown that the light inputs for the green and blue image intensifiers do not have a lens or path converter associated therewith as the path length is the same in the linear configuration.

The three images at the outputs of the three image intensifiers are fused or combined in the dichroic output reflector 21 and a single image is viewable via the ocular or eye piece 22. As noted, the fusing of the three images using the X-Cube enables one to retain the system's resolution and low light level sensitivity with an enhancement in operation. The red image intensifier 11 is optimized to maintain the near IR photons, which the standard monochrome already collects. This will result in a red enhanced image or false color image weighted in the red portion of the spectrum. If true color is desired, then one near IR blocking filter can be placed in front of the input optics to eliminate the signal. The order of the color is not important, the central color path requires a path length compensator. The advantage of the design shown in FIG. 1, is the simplicity of alignment of the components. The disadvantage is that a long focal length is required for both the objective and the eyepiece. The long focal length makes for difficult focusing and requires relatively large compound lens systems, which lens systems may consist of a multiplicity of lenses to obtain the desired focal lengths.

Figure 2:
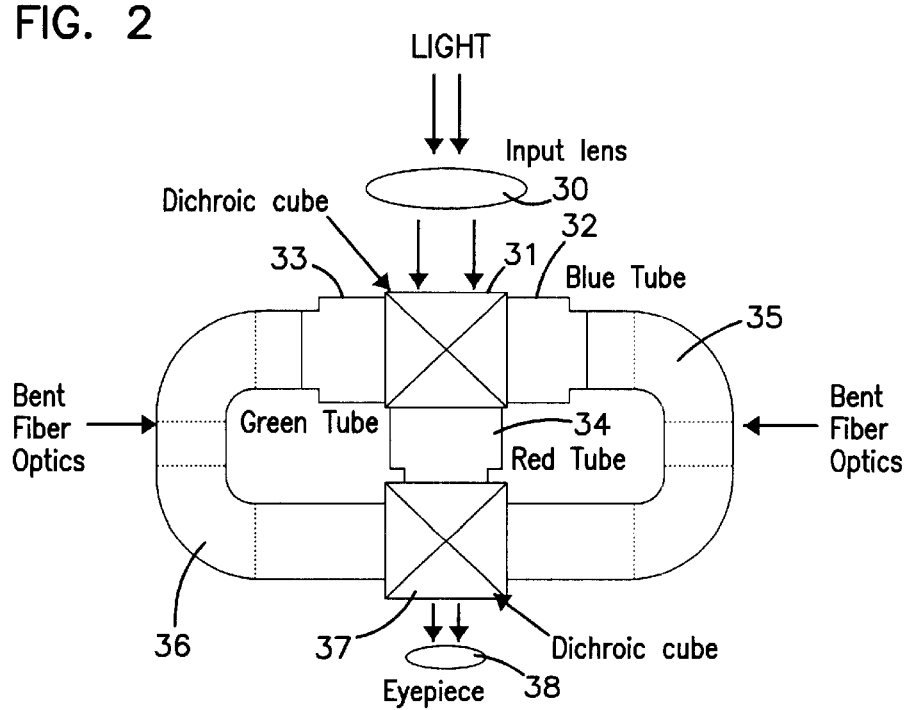
FIG. 2 is a simple schematic of an alternate embodiment of a color night vision system which also employs a dichroic X-Cube to split the light, but utilizes bent optical fibers to direct colored light to the output.

Referring to FIG. 2, there is shown an alternate embodiment of the system which also utilizes dichroic X-Cubes 31 and 37 to split the light. In FIG. 2, there is shown an input lens which received the white light, as for example, depicted in FIG. 1. The light is then split via the dichroic X-Cube 31 so that it goes directly into the input of the green intensifier 33, the blue intensifier 32 and the red intensifier 34. The output from the green and red intensifiers are directed back to the output dichroic cube by means of bent optical fibers 36 and 35. The optical fibers are bundles of optical fibers which are bent and therefore provide a delay with respect to the green and blue outputs, as compared to the red output. As one can ascertain, the output from the red image intensifier 34 is coupled directly to one input of the dichroic cube 37. While the output from the green image intensifier 33 is coupled by a bent fiber optic bundle 36 to another input port or surface of the dichroic cube 37. The output of the blue image intensifier tube 32 is coupled via a respective bent fiber optic bundle 35 to another input surface of the dichroic tube or reflector. The dichroic cube combines the images and directs an output color image into the eyepiece 38 similar to the structure utilized in FIG. 1.

In the case of FIG. 2, the image is transferred to the second X-Cube, through the use of bent fiber optical relays 35 and 36. This eliminates the need for optical delay elements in the central channel of the system. The advantage of this system is that the optical length of both the input and the output is shorter and is at a fixed distance. The disadvantage is the image alignment becomes more difficult due to the bent fiber optic assembly. It is of course understood, that since each image intensifier produces the signal corresponding to the color associated with the image intensifier, that one can take the output of each image intensifier and direct it to a corresponding (CCD) charge couple display device. In this manner, a green CCD would receive the light output from the green tube 33. Another CCD receives the output from the blue tube 32 and another CCD would receive the output from the red tube 37. Each CCD would have associated color. Therefore, the CCD associated with the green image intensifier would be a green device. The device associated with the blue tube would be a blue device and the device associated with the red tube would be red device. The images, which would be identical since the incoming light is identical, would be superimposed to provide a true color signal. As one can ascertain, this is the concept behind color signal generation utilized for many years in photography and other areas.

Figure 3:
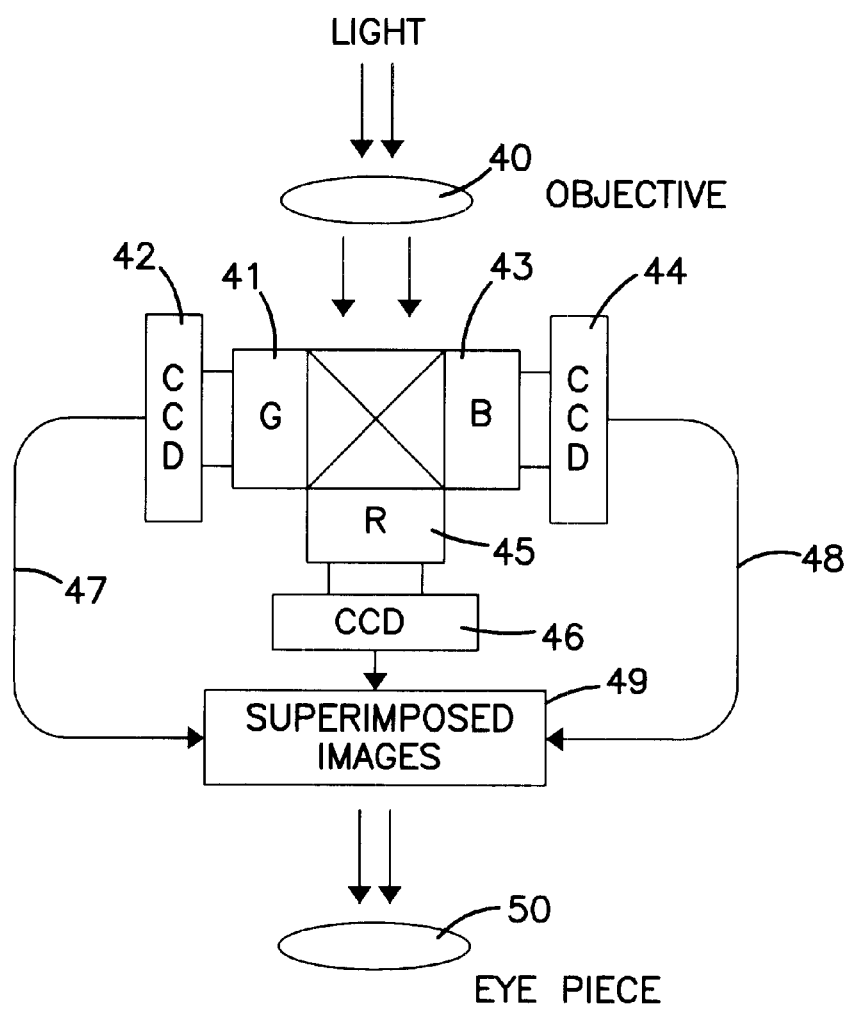
FIG. 3 is a simple diagram showing an alternate embodiment of a color night vision device using charge couple devices coupled to the output of each of the image intensifiers with a charge couple devices produce a color image indicative of red, green and blue.

Referring to FIG. 3, there is shown again a green image intensifier 41, a blue image intensifier 43 and a red image intensifier 45. The blue, green and red image intensifiers all have the same color phosphor (can be any color) and the output of each intensifier is proportional to the amount of red, green and blue light contained in the input light, which is directed through the objective lens 40. In this manner, CCD 42 associated with the green image intensifier produces a green image, while CCD 44 associated with the blue image intensifier produces a blue image, while CCD 46 associated with the red image intensifier produces a red image. Each image from the CCD are superimposed via the module labeled superimposed images 49. Super imposition of each image can be implemented in many ways. For example, the image of CCD 44 and 42 can be directed through fiber optic bundles 47 and 48 and projected on a screen, while the image 46 from CCD 46 is also projected on the same screen. All images are then superimposed being the same size. This can be accomplished, as indicated, in many different ways using various lens systems and so on. In a similar manner, the images from the CCDs can be relayed via mirrors where they would be directed to a common plane and superimposed at the common plane. The image from the CCD's are electronic and can be combined electronically as well.

One skilled in the art could think of many techniques for superimposing a red, green and blue image. As indicated, this combining technique has been widely utilized in photography, color television and so on.

A color night vision device, as described has many applications in the field of medicine, for example, to view the fluorescence of tissues or to use with endoscopic procedures where low levels of light are necessary. Another use would be triage in dark environments as present in natural disasters to enable a doctor or a nurse to view the extent of wounds and to discern blood as compared to tissue. It is obvious that such devices can be used by the military to identify friends or foes determined on the color of the uniform or other indicia, such as emblems and so on. The use of color gives great ability for target recognition, based on the increased contrast and enables one to have complete situational awareness. Such devices can be used in law enforcement to determine suspects on identification as well as situational awareness. It is also understood that color devices can be used in astronomy, zoology, for sportsman and a host of other uses. There is actually no particular limit to the use of color devices, as one can ascertain. It is also understood that a major aspect is using reflectors or dichroics to separate light and techniques of using such dichroics for the separation of light is well known in the field. The use of phosphors that produce light in the red, green and blue areas are also well known and exist in the field of color television. As one can ascertain, a shadow mask tube, for example, utilizes a phosphor triad which consists of red, green and blue phosphor and the same phosphors can be utilized for the screen outputs of the image intensifiers.

It is understood that one skilled in the art will ascertain many alternatives and alternate embodiments which should become apparent to one skilled in the art, as well as equivalence and substitutions for the various devices described above. It is therefore indicated all such embodiments and alternatives are deemed to be encompassed within the breadth and scope of this invention as defined by the appended claims.

What is claimed is:

1. A color night vision apparatus, comprising:

at least three image intensifier tubes, each one associated with a different one primary color, each tube having an input for receiving a low light image and an output for providing an intensified image;

an input dichroic frequency splitter positioned between the input of each tube and having an input port for receiving said low light image, and directing said input signal to said input of each tube, to cause each tube to provide an intensified output signal of said input signal and according to the primary color content in said input signal as associated with said respective tube, means for adjusting path lengths of said output signals of each tube; and means responsive to said output signals of each tube for combining said signals indicative of each primary color to provide an output color image indicative of said low light image.

2. The color apparatus according to claim 1 wherein said first tube is associated with green, said second tube associated with blue and said third tube associated with red.

3. The color night vision apparatus according to claim 1 wherein said means responsive to said output signals comprises an output dichroic frequency splitter positioned at the output of each tube and operative to combine the outputs into a single color signal indicative of said low light image.

4. The color night vision apparatus according to claim 2 wherein said means responsive to said output signals comprises first and second bent fiber optic bundles each having a first and second end with said first end of said first bundle positioned at said output of the first image intensifier for providing an output image indicative of the primary color green (G) and with the said first end of said second fiber optic bundle positioned at said output of said second tube providing an image indicative of the primary color blue (B), with a dichroic cube coupler having first, second and third inputs and an output, with the second end of said first bundle coupled to said first input of said coupler, with said second end of said second bundle coupled to said second input of said coupler, and with the output of said third tube indicative of the primary color red coupler to said third input of said dichroic coupled, to provide a full color image of said low light image at said output of said dichroic cube coupler.

5. The color night vision apparatus according to claim 1 wherein said means responsive to said output signals includes first, second and third CCD's, each having an input for receiving an image and an output for generating an image of a predetermined primary color, with said outputs of said charge coupled devices combined to provide a color image of said low light image.

6. The color night vision apparatus according to claim 1 further including an optical element coupled to one of said image intensifiers and operative to adjust the path length of at least one of said primary colors with respect to the path length of other primary colors to maintain the same first plane for each color.

7. The color night vision apparatus according to claim 2 further including a filter positioned at the input of said image intensifier associated with the primary color red to eliminate near infrared photons.

8. The color night vision apparatus according to claim 1 wherein said input dichroic frequency splitter is a dichroic X-Cube having a first input for receiving said low light image and first, second and third outputs for providing at each output an associated different primary color image obtained for said input image.

9. The color night vision apparatus according to claim 1 further comprising:

an objective lens positioned at said input port of said input dichroic filter to provide a collimated light image to said input port.

10. The color night vision apparatus according to claim 1 wherein said means responsive to said output includes at least one ocular lens positioned with respect to said output color image to enable a user to view said image through said device.

11. The color night vision apparatus according to claim 3 wherein said output dichroic frequency splitter comprises a dichroic X-Cube having a first input for receiving the output of said first intensifier, a second input for receiving the output of said second intensifier and a third input for receiving the output of said third intensifier and an output for providing a fused image of said three outputs indicative of a color image of said low light image.

12. The color night vision apparatus according to claim 1 wherein each image intensifier tube is optimized to amplify the particular color wavelength provided at the input of each device.

13. The apparatus as recited in claim 1, wherein said means for adjusting path lengths is selected from group comprising: lens, fiber-optic bundles.

* * * * *